(12) United States Patent
Rekimoto

(10) Patent No.: US 7,119,795 B2
(45) Date of Patent: Oct. 10, 2006

(54) INFORMATION PROCESSING UNIT, CONTROL METHOD FOR INFORMATION PROCESSING UNIT FOR PERFORMING OPERATION ACCORDING TO USER INPUT OPERATION, AND COMPUTER PROGRAM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 440 days.

(21) Appl. No.: 10/645,100

(22) Filed: Aug. 21, 2003

(65) Prior Publication Data
US 2004/0104895 A1    Jun. 3, 2004

(30) Foreign Application Priority Data
Aug. 23, 2002   (JP)   ............................. 2002-244162

(51) Int. Cl.
*G09G 5/00*   (2006.01)
(52) U.S. Cl. ...................................... 345/168; 345/172

(58) Field of Classification Search ................. 345/172
See application file for complete search history.

(56) References Cited

U.S. PATENT DOCUMENTS

| 5,920,303 A | * | 7/1999 | Baker et al. ................. 345/172 |
| 2004/0036632 A1 | * | 2/2004 | Ford ........................... 341/22 |

* cited by examiner

*Primary Examiner*—Amare Mengistu
*Assistant Examiner*—Donna Lui
(74) *Attorney, Agent, or Firm*—Finnegan, Henderson, Farabow, Garrett & Dunner L.L.P.

(57) ABSTRACT

A keyboard mode is switched according to the determination of a finger contact on a touch sensitive pad to assign mouse buttons to specific keys, such as the F and J keys, on the keyboard. The user can use the touch sensitive pad without separating the hands from the home positions. Keys other than the F and J keys can be substituted for the mouse buttons as desired. The touch sensitive pad can be used as a shift key, and the function thereof can be temporarily assigned to a key on the keyboard.

14 Claims, 12 Drawing Sheets

FIG. 8

| | | | |
|---|---|---|---|
| T | File | Y | Insert |
| G | Edit | H | Format |
| B | View | N | Tool |

INFORMATION PROCESSING UNIT, CONTROL METHOD FOR INFORMATION PROCESSING UNIT FOR PERFORMING OPERATION ACCORDING TO USER INPUT OPERATION, AND COMPUTER PROGRAM

BACKGROUND OF THE INVENTION

1. Field of the Invention

The present invention relates to information processing units which activate an application, operate according to a user input, and assist various user tasks, control methods for information processing units for performing an operation according to a user input operation, and computer programs, and more particularly, to an information processing unit which provides a work environment provided with a character input and a coordinate designation input, a control method for an information processing unit for performing an operation according to a user input operation, and a computer program.

More specifically, the present invention relates to information processing units structured by incorporating a coordinate input function into a character-input keyboard, control methods for information processing units for performing an operation according to a user input operation, and computer programs, and more particularly, to an information processing unit having an improved operability in cases when keyboard input operations and coordinate input operations are alternately performed, a control method for an information processing unit for performing an operation according to a user input operation, and a computer program.

2. Description of the Related Art

Various personal computers (PCs) have been developed and made commercially available, such as desktop-type PCs, tower-type PCs, and notebook-type PCs, as recent technological innovation has been made. Among them, notebook-type PCs have been designed and manufactured for mobile environments. More specifically, they have been made compact and lightweight, so that the user can carry them outdoors or to any destinations and use them there.

Almost all computers provide a graphical user interface (GUI) function, which implements graphic-based user inputs. In a GUI environment, a desktop space and a great number of icons are prepared on the display screen. All resource objects, such as files, which are handled by the computer system can be represented by the corresponding icons on the desktop screen having the GUI. The user can directly apply an operation (such as clicking or drag-and-drop operation) to a displayed object, such as icons indicating programs, data, folders, and devices, on the screen by using a user input apparatus, such as a mouse, to operate the computer intuitively in an easy-to-understand manner.

To implement such a GUI environment, it is necessary for the computer to have a coordinate designation and input apparatus for specifying a desired location on the desktop screen, such as a mouse, in addition to a conventional user input apparatus, such as a keyboard.

For coordinate designation and input operations, a mouse is connected to desktop computers and other installation-type computers and used. In contrast, a in-keyboard-embedded-type device, such as a track pad (or a touch sensitive pad) is used instead of a mouse for notebook-type computers because of convenience of carrying the computers.

In such notebook-type computers, general mouse operations, such as clicking and dragging, can be implemented by combinations of operations on the track pad and operations on buttons disposed below the track pad.

In this case, however, since the buttons are apart from the keyboard, when the track pad is operated, fingers of the user are separated from their home positions (in usual QWERTY-type keyboards, the user usually places the forefinger of the left hand on the F key and the forefinger of the right hand on the J key as their home positions). Therefore, when typing on the keyboard and mouse operations are alternately performed, it is necessary for the user to look for the home positions visually after a mouse operation is finished, which is an operation problem.

FIG. 1 shows example arrangements of the fingers and hands of the user when the user operates a touch sensitive pad in a conventional manner. In FIG. 1, two cases are shown. In one case, the user uses the thumb of the right hand to operate the touch sensitive pad while using the thumb of the left hand to operate a mouse button, and in the other case, the user uses the forefinger of the right hand to operate the touch sensitive pad while using the thumb of the left hand to operate a mouse button. In either case, however, when the user operates the touch sensitive pad, fingers of the user are separated from their home positions, which means that the user feels inconvenient in performing both mouse operations and key inputs.

Various methods have been proposed to overcome this problem, such as rendering operations on the touch sensitive pad, including tapping, as button operations. In any of these methods, however, a reduction in operability caused by erroneous recognition occurs as a problem. In addition, moving a mouse while pressing a mouse button, which is a so-called "drag" operation, cannot be replaced only with recognition of tapping.

SUMMARY OF THE INVENTION

Accordingly, it is an object of the present invention to provide an information processing unit which provides a work environment provided with a character input and a coordinate designation input, a control method for an information processing unit for performing an operation according to a user input operation, and a computer program.

Another object of the present invention is to provide an information processing unit structured by incorporating a coordinate input function into a character-input keyboard, a control method for an information processing unit for performing an operation according to a user input operation, and a computer program.

Further object of the present invention is to provide an information processing unit having an improved operability in cases when keyboard input operations and coordinate input operations are alternately performed, a control method for an information processing unit for performing an operation according to a user input operation, and a computer program.

One of the foregoing objects is achieved in a first aspect of the present invention through the provision of an information processing unit for executing predetermined processing in response to a user input, including a key input section provided with a plurality of keys, for inputting data assigned to a pressed key; a coordinate input section for performing a coordinate input according to a user's finger contact operation; and key-assignment control means for changing key assignment in the key input section according to the result of detection of a user's finger contact, obtained by the coordinate input section.

One of the foregoing objects is achieved in a second aspect of the present invention through the provision of a control method for an information processing unit provided with a key input section and a coordinate input section, for performing an operation according to a user input operation, the control method including a step of determining whether a user operation has been performed for the key input section; a step of detecting the contact of a user's finger on the coordinate input section; a step of performing a process according to the position of the contact of the user's finger on the coordinate input section; and a step of interpreting the user operation performed for the key input section according to whether or not the contact of the user's finger on the coordinate input section has occurred.

The coordinate input section described here is a device, such as a "touch sensitive pad", for detecting the contact position, the movement direction, and others of a user's finger tip by the capacitance detection method. Alternatively, the coordinate input section may be a device which is provided at a suitable position in the key arrangement of a keyboard and designates coordinates by pressure applied in the directions left and right and back and forth, like a "track point". It may be possible that key assignment for usual key input operations is applied to each key of the key input section while the coordinate input section does not detect the contact of a user's finger, and key assignment to a specific key of the key input section is changed in response to the fact that the coordinate input section has detected the contact of a user's finger.

More specifically, a function for designating an input-coordinate selection operation may be assigned to a home-position key in the key input section in response to the fact that the coordinate input section has detected the contact of a user's finger.

Since the click buttons of a mouse are usually apart from the keyboard, when the track pad is operated, fingers of the user are separated from their home positions. Therefore, when typing on the keyboard and mouse operations are alternately performed, it is necessary for the user to look for the home positions visually after a mouse operation is finished, which is an operation problem. In contrast, in the present invention, the user performs usual keyboard operations, and the user just needs to press home position keys, such as the F and J keys, which are substituted for the mouse click buttons, by the left and right forefingers while placing the left or right thumb on the touch sensitive pad. In other words, mouse operations with the use of the touch sensitive pad are possible while both hands are placed at the home positions on the keyboard. In addition, since such click buttons are usually disposed in front of the touch sensitive pad, that is, a front edge part on the keyboard plane, the left and right click buttons can be omitted in designing the computer, which leads to a more compact computer.

Alternatively, a menu selection function or another function may be assigned to a key in the key input section in response to the fact that the coordinate input section has detected the contact of a user's finger.

In such a case, for example, a menu window is pop-up-displayed on the computer screen in response to the contact of a finger on the touch sensitive pad. When the key is pressed, the corresponding function is activated by this one stroke. Menu items can also be selected by usual mouse operations.

To avoid erroneous detection of the contact of a finger tip, the coordinate input section may detect a user's finger tip by whether the user's finger tip contacted the touch sensitive pad within a past predetermined period (for example, 100 milliseconds).

Designated-area storage means or step may be further provided, of storing the content of a designated area in response to the fact that the coordinate input section designates the area while a predetermined key is being pressed in the key input section and that the predetermined key is then released. Designated-area duplication means or step may be further provided, of duplicating the content stored in the designated-area storage means or step at a designated position, in response to the fact that the coordinate input section designates the position while a predetermined key is being pressed in the key input section and that the predetermined key is then released.

The designated-area storage means or step described here corresponds to a "cut" operation for temporarily storing the content in a designated area designated by the mouse. The designated-area duplication means or step corresponds to a "paste" operation for copying the temporarily stored content at a designated position.

When a finger contacts the touch sensitive pad, a predetermined key such as the V key functions as a paste button. A cut command copies data in a paste buffer. It is assumed that the paste buffer holds a plurality of data items.

It is assumed that a "paste" command is assigned to the V key. When the V key is pressed and then released immediately, the last item in the paste buffer is pasted. When the user moves a finger on the touch sensitive pad while pressing the V key, the items in the paste buffer are displayed in a menu. When an item is selected by a pointer operation and the V key is released, the desired data is pasted to the designated position.

In this way, when a key is just pressed, the corresponding "basic function" is executed, and when a finger is moved on the touch sensitive pad while the key is being pressed, the corresponding "extended function" is executed.

One of the foregoing objects is achieved in a third aspect of the present invention through the provision of a computer program having described, in a computer readable format, an operation performed according to a user input operation, of a computer system provided with a key input section and a coordinate input section, the computer program including a step of determining whether a user operation has been performed for the key input section; a step of detecting the contact of a user's finger on the coordinate input section; a step of performing a process according to the position of the contact of the user's finger on the coordinate input section; and a step of interpreting the user operation performed for the key input section according to whether or not the contact of the user's finger on the coordinate input section has occurred.

The computer program according to the third aspect of the present invention is described in a computer readable format so as to implement predetermined processing in the computer system. In other words, when the computer program according to the third aspect of the present invention is installed into the computer system, cooperative operations are achieved in the computer system, and the same advantages as in the information processing unit according to the first aspect of the present invention and in the control method for the information processing unit for performing an operation according to a user input operation, according to the second aspect of the present invention are obtained.

As described above in detail, according to the present invention, an information processing unit structured by incorporating a coordinate input function into a character-input keyboard, a control method for an information processing unit for performing an operation according to a user input operation, and a computer program are provided.

In addition, according to the present invention, an information processing unit having an improved operability in cases when keyboard input operations and coordinate input operations are alternately performed, a control method for an information processing unit for performing an operation according to a user input operation, and a computer program are provided.

In a computer according to the present invention, a keyboard mode is switched according to the determination of a finger contact on a touch sensitive pad to assign mouse buttons to specific keys, such as the F and J keys, on the keyboard. Therefore, the user can use the touch sensitive pad without separating the hands from the home positions. The touch sensitive pad can be used as a shift key, and the function thereof can be temporarily assigned to a key on the keyboard.

In addition, an information processing method, device or program based on this invention would comprise steps or means or etc. Of; receiving key input information according to user's key input operation on key input means; receiving coordinate input information according to user's finger contact operation on coordinate input means; recognizing the user input based on the received key input and coordinate input information; wherein the key assignment of the key input information being changed when the received coordinate input information is in predefined state; and executing the processing in response to the recognized user input.

For this invention, it's noted that the key input and coordinate input means can be implemented in both of unified or separated forms, further both of hardware or software (virtual) forms. The key input operation can be not only press, but also contact, approach, approximate, hit, scratch, or any other operation which can be recognized as user's operation on key input means. The coordinate input can be detected as not only 2D position input, but also 3D coordinate input, orientation input, rotation input, velocity input, acceleration input, or any other coordinate input which can be recognized as user's operation on coordinate input means. The executed processing can be applicable as both of process on host machine like personal computer or peripheral machine like keyboard.

Other objects, features, and advantages of the present invention will become clear by embodiments of the present invention and a detailed description based on the accompanying drawings, described later.

BRIEF DESCRIPTION OF THE DRAWINGS

FIG. 8 is a view showing an example menu window pop-up-displayed on the screen of a liquid-crystal display panel 3 in response to a finger contact on the touch sensitive pad 6.

DESCRIPTION OF THE PREFERRED EMBODIMENTS

Figure 1:
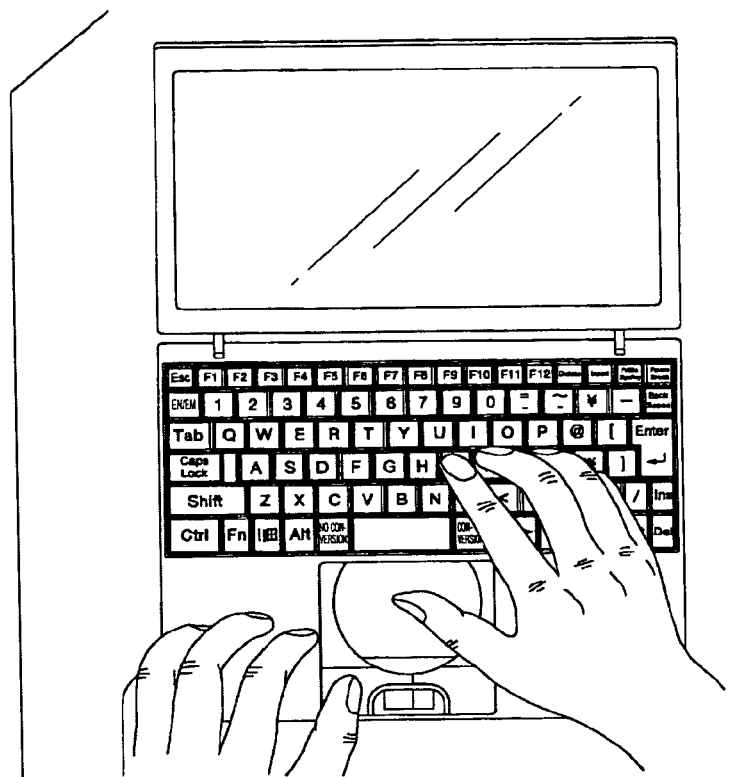
FIG. 1 includes views showing arrangements of the hands and fingers of the user, obtained when a touch sensitive pad is operated in a conventional manner.
Figure 1:
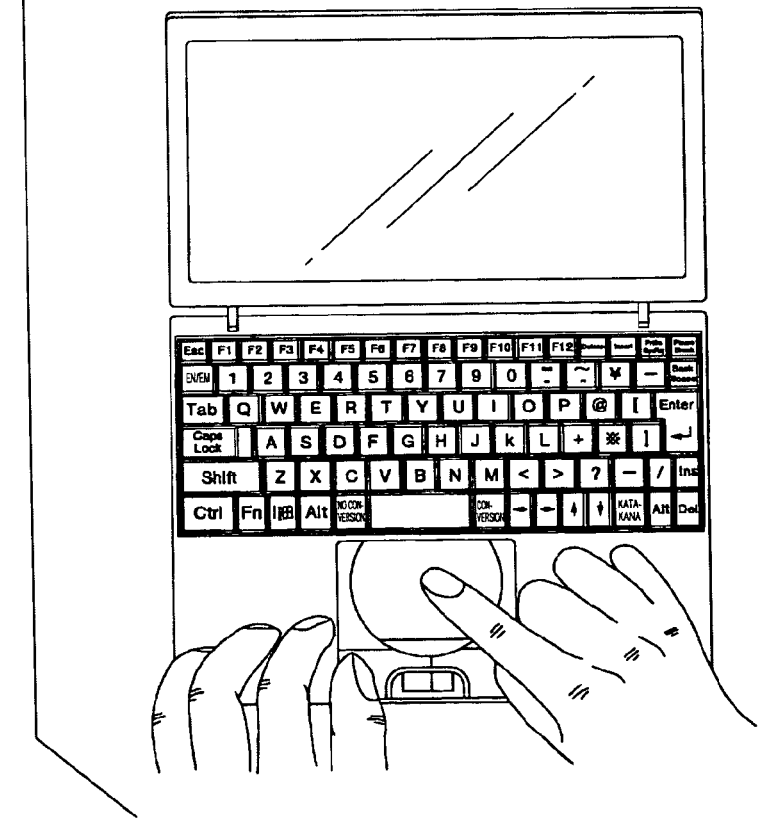

An embodiment of the present invention will be described below in detail by referring to the drawings.

A. System Configuration

Figure 2:
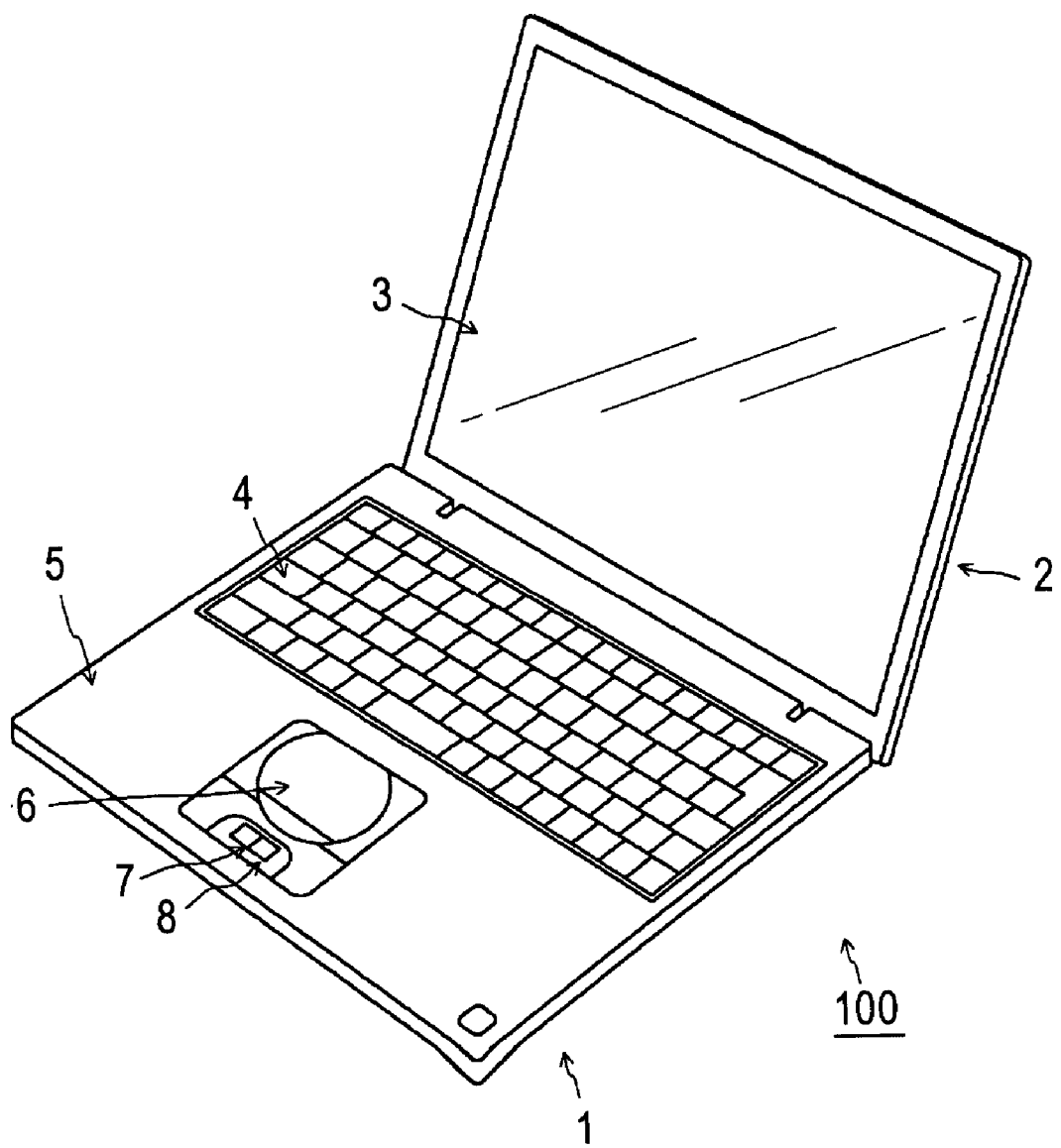
FIG. 2 is a view showing the appearance of a notebook-type computer 100 suited to implement the present invention.

FIG. 2 shows the appearance of a computer 100 suited to implement the present invention. The computer shown in FIG. 1 is also called a "notebook"-type computer, is configured to be compact and lightweight with a footprint of about the A4 or B5 size, and provides portability.

As shown in FIG. 2, the notebook-type computer 100 is formed of a body 1 in which a keyboard 4 is disposed at an upper surface, and a cover housing 2 in which a liquid-crystal display panel 3 is embedded, and has a clamshell structure in which the cover housing 2 is hinge-coupled at an almost rear end of the body 1 in a manner in which the cover housing 2 can be opened and closed as desired.

The body 1 includes therein a main printed circuit board, a hard disk drive, and other components, such as an external storage apparatus and a battery. In the keyboard 4 disposed at the upper surface of the body 1, alphabetical keys are disposed, for example, in the QWERTY arrangement, and numeric keys and various function keys are disposed.

At the front side of the keyboard 4, a flat section called a palm rest 5, where the user can place the palms when performing key inputs, are formed. And, almost at the center of the palm rest 5, a touch sensitive pad 6 serving as a coordinate designation apparatus, instead of a mouse, is disposed.

The touch sensitive pad 6 employs, for example, a capacitance detection method to detect the position, the movement distance, the movement speed, and others of a finger tip of the user, moving on the touch sensitive pad 6 by a change in capacitance obtained when the finger tip touches the surface of the touch sensitive pad 6.

At the front side of the touch sensitive pad, left and right click buttons 7 and 8 serving as mouse buttons are disposed.

As described later, the determination of a finger contact on the touch sensitive pad switches the keyboard mode to assign mouse buttons to predetermined keyboard keys, such as the F and J keys, in the present embodiment. Therefore, it is possible to omit the left and right click buttons 7 and 8 in designing the computer.

Figure 3:
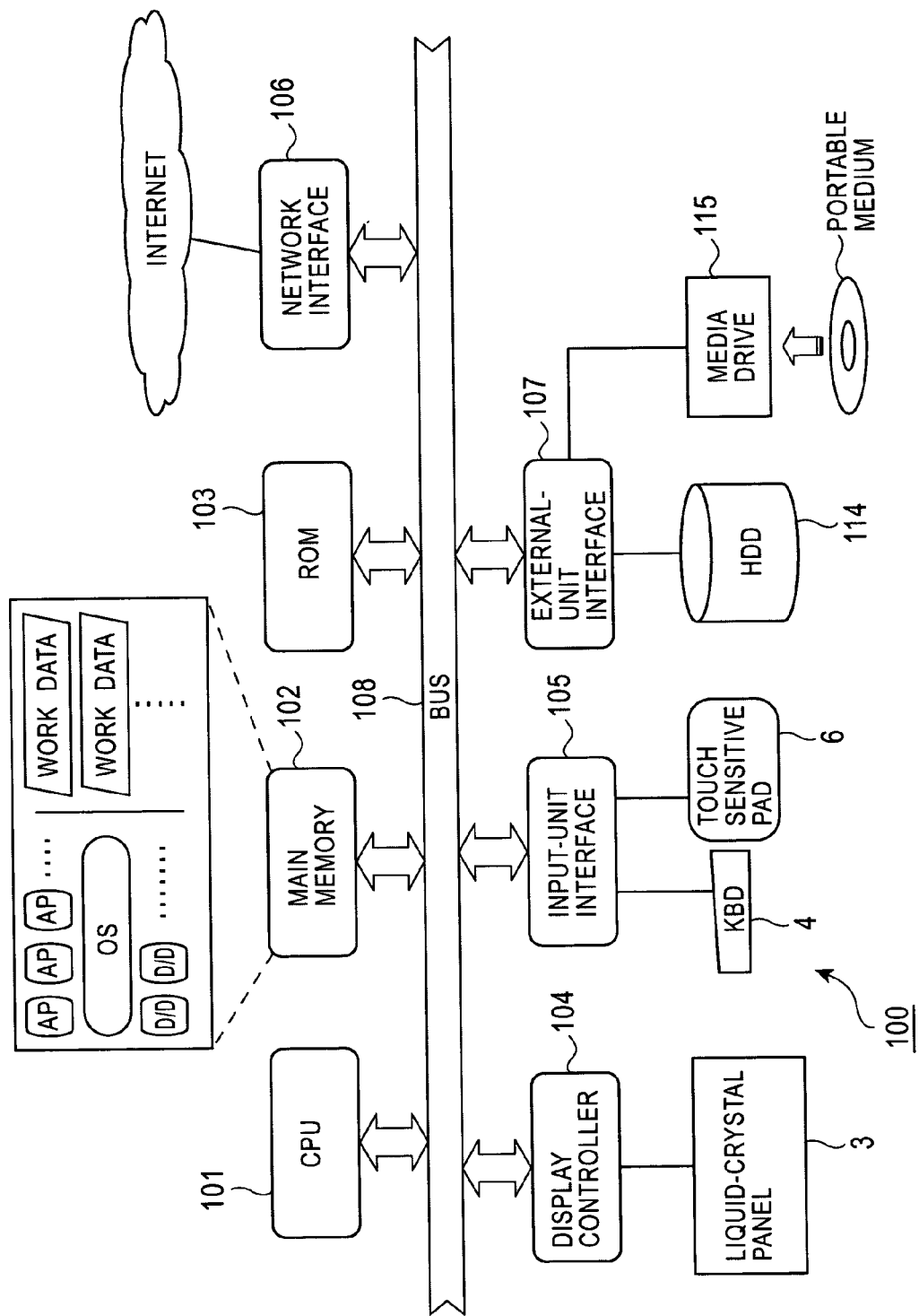
FIG. 3 is a block diagram of the internal hardware structure of the computer 100 according to an embodiment.

FIG. 3 is a block diagram showing the internal hardware structure of the computer 100 according to the present embodiment.

A central processing unit (CPU) 101 serving as a main controller executes various application programs under an operating system (OS). As shown in FIG. 3, the CPU 101 and other units (described later) are mutually connected through a bus 108.

A main memory 102 is a storage apparatus to which program code to be executed by the CPU 101 is loaded and which temporarily holds work data of a program being executed, and is formed of a semiconductor memory, such as a dynamic RAM (DRAM). For example, an application software (AP), the operating system, device drivers (D/Ds) for the input and output operations of various hardware, such as the keyboard 4 and the touch sensitive pad 6, and others are loaded into the main memory 102 as programs to be executed. Work data used during the execution of these programs is temporarily stored in the main memory 102.

A read-only memory (ROM) 103 is formed of a semiconductor memory for perpetually storing data, and, for example, stores a power-on self test (POST) running at activation and hardware-input-and-output program code, that is, a basic input/output system (BIOS).

A display controller 104 is a special controller for processing a picture drawing instruction issued by the CPU 101. Picture-drawing data processed by the display controller 104 is written, for example, into a frame buffer (not shown), and is then screen-output to the liquid-crystal display panel 3. The display screen of the liquid-crystal display panel 3 generally has the role of visually feeding back to the user the input content of the user, its processing result, or a system message such as an error.

An input-unit interface 105 connects user input units such as the keyboard 4 and the touch sensitive pad 6, to the computer 100. Interrupt levels are assigned to the keyboard 4 and the touch sensitive pad 6, and when a user input operation is applied to either unit, an interrupt request is generated. The CPU 101 activates the corresponding interrupt handler, such as a keyboard driver or a touch-sensitive-pad driver, in response to the interrupt request to take a user input into the computer 100.

A network interface 106 can connect the computer 100 to a local network, such as a local area network (LAN), and further to a wide area network, such as the Internet, according to a predetermined communication protocol, such as the Ethernet (registered trademark) protocol.

A plurality of host terminals (not shown) are connected on a network in a transparent state to form a distributed computing environment. Distribution service of software programs and data contents can be achieved on the network. For example, program modules, such as application programs, operating systems, device drivers for various-hardware operations, and updated versions thereof, can be downloaded through the network.

An external-unit interface 107 connects external units, such as a hard disk drive (HDD) 114 and a media drive 115, to the computer 100.

The HDD 114 is an external storage apparatus on which a magnetic disk is fixedly mounted as a storage medium, and is superior to the other external storage apparatuses in terms of the storage capacity and the data transfer rate. The operation of placing a software program in the HDD 114 in an executable state is called the "installation" of the program into the computer. The HDD 114 generally stores the program code of an operating system to be executed by the CPU 101, application programs, device drivers, and others in a non-volatile manner.

The media drive 115 is an apparatus to which portable media, such as a compact disc (CD), a magneto-optical disc (MO), and a digital versatile disc (DVD), are loaded and which accesses the data recording surface thereof.

The portable media are mainly used for storing software programs and data files in a computer readable format as backups and for transferring (including sales and distribution) them among systems. For example, application programs, operating systems, device drivers for various-hardware operations, and others can be physically distributed to a plurality of units by using the portable media.

Figure 4:
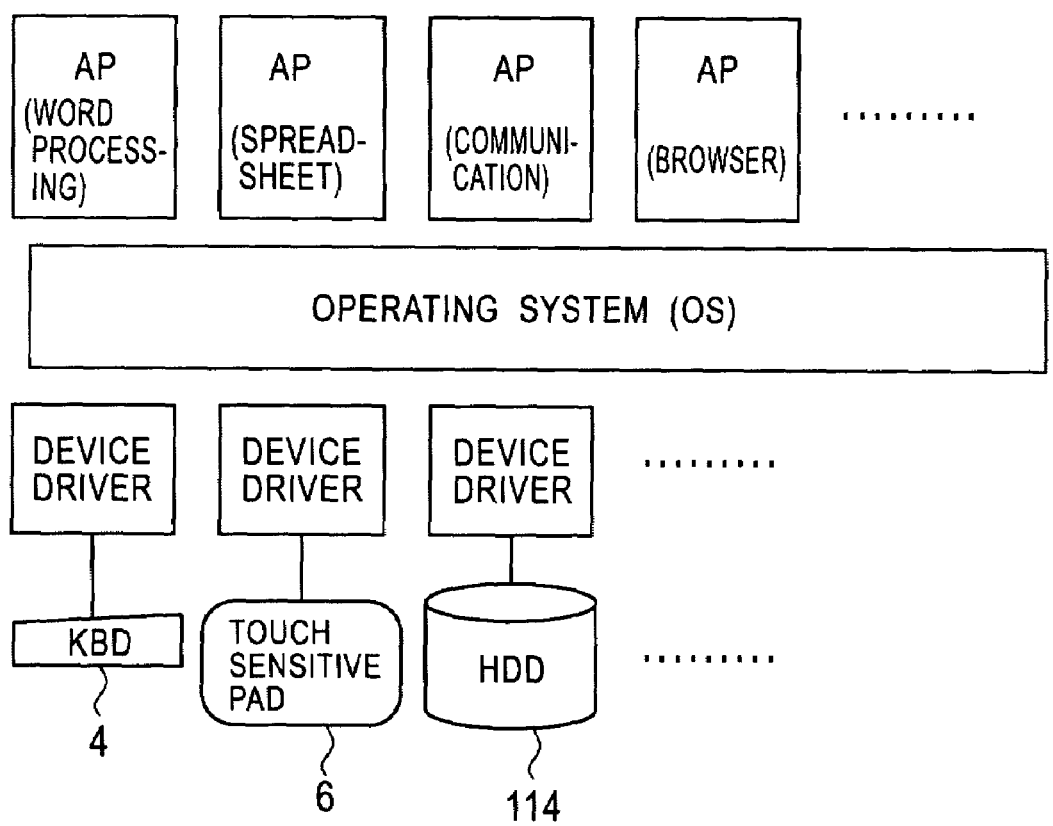
FIG. 4 is a block diagram of the hierarchical structure of software programs running on the computer 100, having the hardware structure shown in FIG. 3.

FIG. 4 is a block diagram showing the hierarchical structure of software programs activated on the computer 100, which has the hardware structure shown in FIG. 3.

Device drivers are the lowest-level software and perform processing for the input and output operations of various hardware units, such as the keyboard 4, the touch sensitive panel 6, the hard disk drive 114, and the liquid-crystal display panel 3. For example, the device drivers convert commands having a general format and issued by upper-level software, such as the operating system, to those having a format suited to hardware operations unique to the corresponding devices. In addition, the device drivers performs event processing in response to an interrupt request generated by devices, such as the keyboard 4 and the touch sensitive device 6, and issues messages to the operating system and to the corresponding application program.

The operating system is basic software for synthetically managing the hardware and software of the computer, and generally implements a multi-task environment. The operating system is also provided with an application programming interface (API) with which application programs call various functions. The API is a function with which application programs access the hardware through the operating system, instead of directly operating the hardware. The intervention of the API absorbs the differences among hardware and standardizes hardware operations.

Application programs (APs) are positioned at the highest-level software, and makes the computer specialize in practical usage, such as word-processing/editing, spreadsheet, communications, and content browsing.

B. Keyboard-Mode Switching Function

As shown in FIG. 2, the notebook-type computer 100 according to the present embodiment has the touch sensitive pad, an in-keyboard-embedded device, as a substitute for a mouse, for convenience of carrying the computer. General mouse operations, such as clicking and dragging, can be implemented by combinations of operations on the touch sensitive pad 6 and operations of the click buttons 7 and 8 disposed at the front side of the touch sensitive pad.

In this case, however, since the buttons are apart from the keyboard, when the track pad is operated, fingers of the user are separated from their home positions (see FIG. 1). Therefore, when typing on the keyboard and mouse (track pad) operations are alternately performed, it is necessary for the user to look for the home positions visually after a mouse operation is finished, which is an operation problem.

In contrast, in the present embodiment, the determination of a finger contact on the touch sensitive pad switches the keyboard mode to assign predetermined keyboard keys, such as the F and J keys, to mouse buttons.

The touch sensitive pad 6 generally employs the capacitance detection method, to detect the position of a finger tip of the user on the touch sensitive pad 6 by a change in capacitance obtained when the finger tip touches the surface of the touch sensitive pad 6. Prior to this detection, a "finger-tip contact", which means whether a finger tip contacts the touch sensitive pad 6, can be detected. In response to this finger-tip contact, the assignment of predetermined keys of the keyboard 4 can be automatically switched.

Therefore, the user performs usual keyboard operations, and the user just needs to press the F and J keys, which are substituted for mouse buttons, by the left and right forefingers while placing the left or right thumb on the touch sensitive pad 6. In other words, mouse operations with the use of the touch sensitive pad 6 is possible while both hands are placed at the home positions on the keyboard 4. In addition, the left and right click buttons 7 and 8 can be omitted in designing the computer, which leads to a more compact computer.

Figure 5:
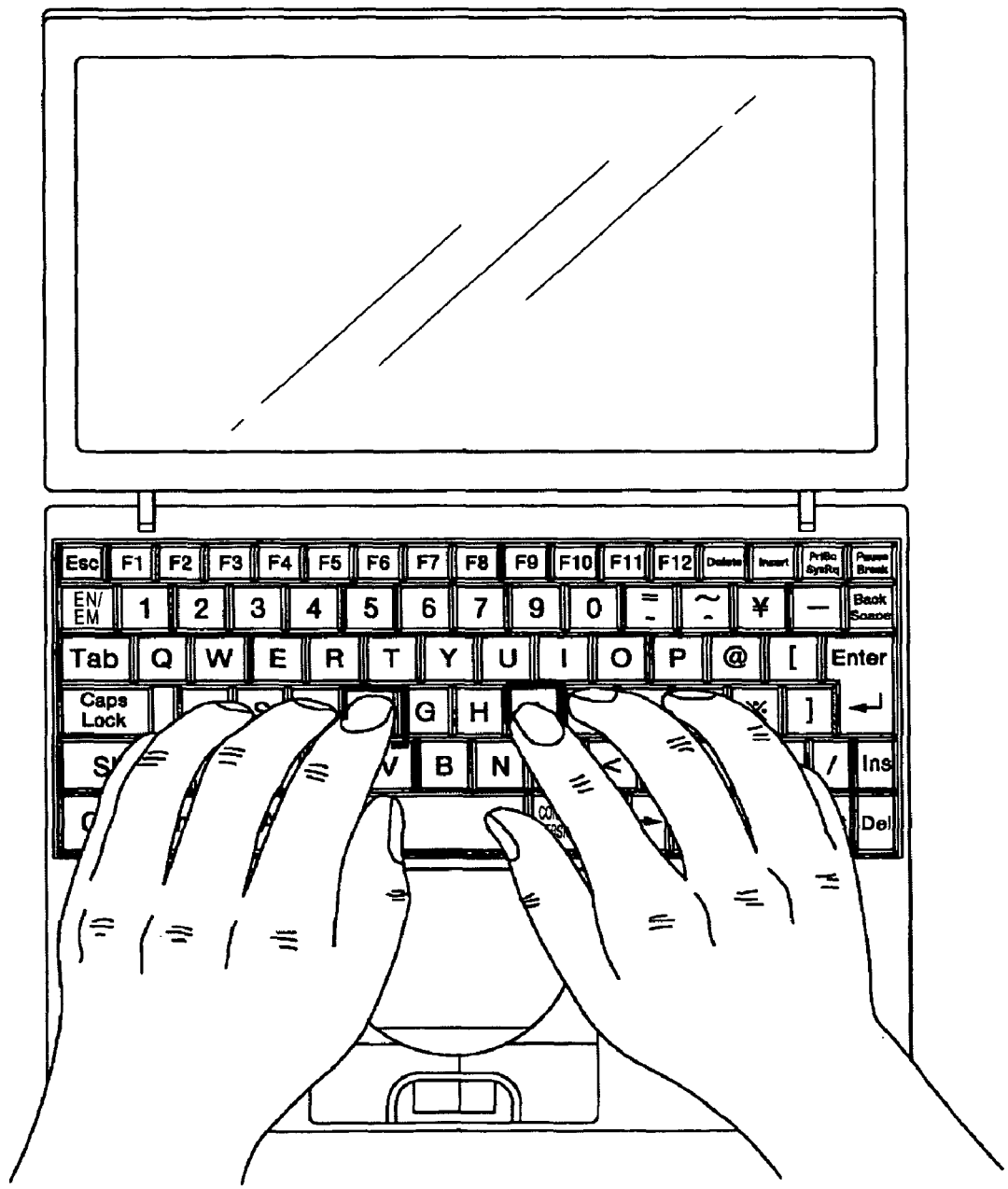
FIG. 5 is a view showing an arrangement of the hands and fingers of the user, obtained when the user operates a touch sensitive pad 6 in the notebook-type computer 100 according to the embodiment.
Figure 6:
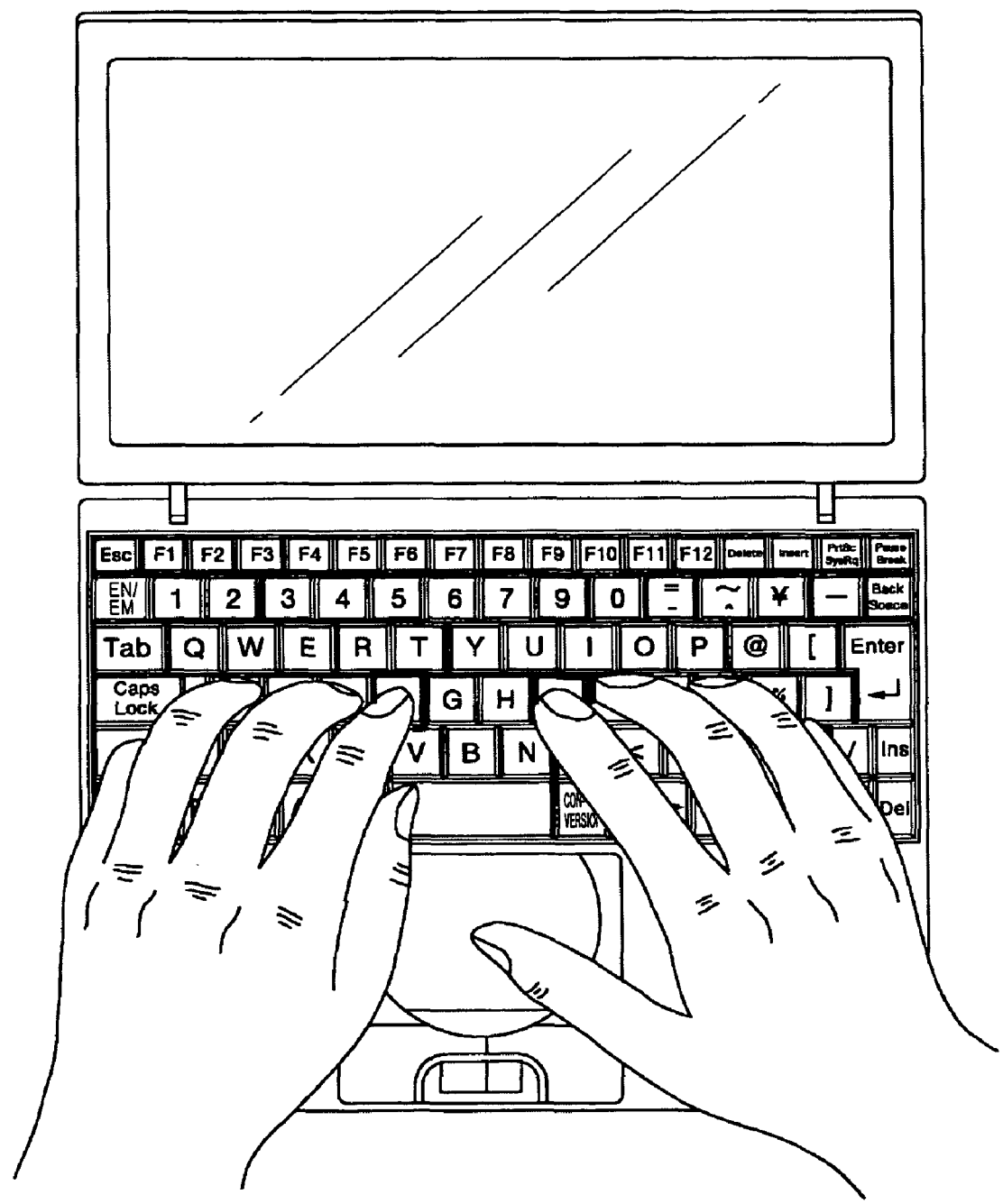
FIG. 6 is a view showing an arrangement of the hands and fingers of the user, obtained when the user operates the touch sensitive pad 6 in the notebook-type computer 100 according to the embodiment.

FIG. 5 and FIG. 6 show the arrangement of the hands and fingers of the user obtained when the keyboard 4 and the touch sensitive pad 6 are operated in the notebook-type computer 100 according to the present invention.

When a finger contacts the touch sensitive pad 6, the finger contact can be detected by the capacitance detection method. In response to the finger contact, the left and right click button functions of a mouse are assigned to the F and J keys, which are part of the home positions on the keyboard 4. Therefore, mouse operations with the use of the touch sensitive pad 6 becomes possible while both hands are placed at the home positions on the keyboard 4.

Any keys, even other than the F and J keys, can be substituted for mouse buttons as the user desires. For example, the left and right click buttons may be assigned to the J and K keys, so that mouse operations can be performed only with the right hand.

Further, in response to a finger contact on the touch sensitive pad 6, functions other than the mouse-button functions can be assigned to keys on the keyboard 4. For example, the touch sensitive pad 6 is used as a shift key, and the function thereof may be temporarily assigned to a key on the keyboard 4.

Figure 7:
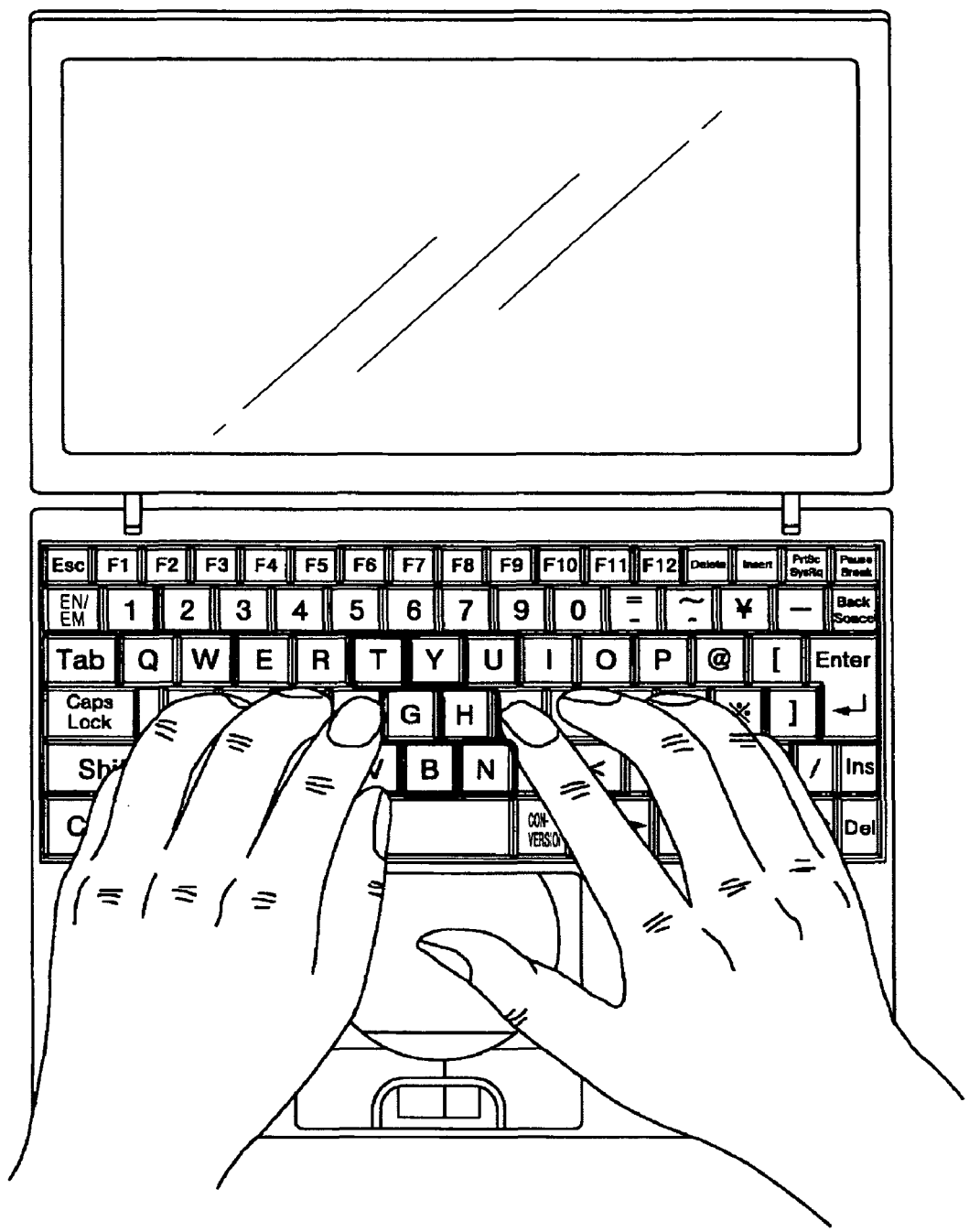
FIG. 7 is a view showing a case in which functions are temporarily assigned to specific keys in the keyboard 4 in response to a finger contact on the touch sensitive pad 6.

FIG. 7 shows a case in which functions are temporarily assigned to specific keys on the keyboard 4 in response to a finger contact on the touch sensitive pad 6. In the case shown in FIG. 7, in response to the finger contact on the touch sensitive pad 6, menu selection keys are assigned, as shown below, to six keys, T, Y, G, H, B, and N, arranged in almost two columns almost at the center of the keyboard 4, which has the QWERTY arrangement.

T: File
Y: Insert
G: Edit
H: Format
B: Tools
N: View

Figure 8:
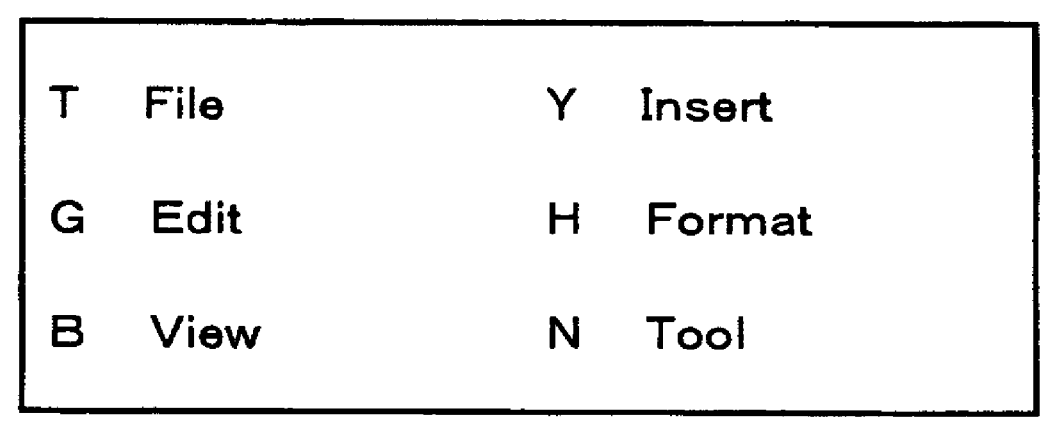

In response to a finger contact on the touch sensitive pad 6, a menu window such as that shown in FIG. 8 are pop-up-displayed on the screen of the liquid-crystal display panel 3. When one of these keys are pressed, the corresponding function is activated at one stroke. A menu item can also be selected by a usual mouse operation.

Figure 9:
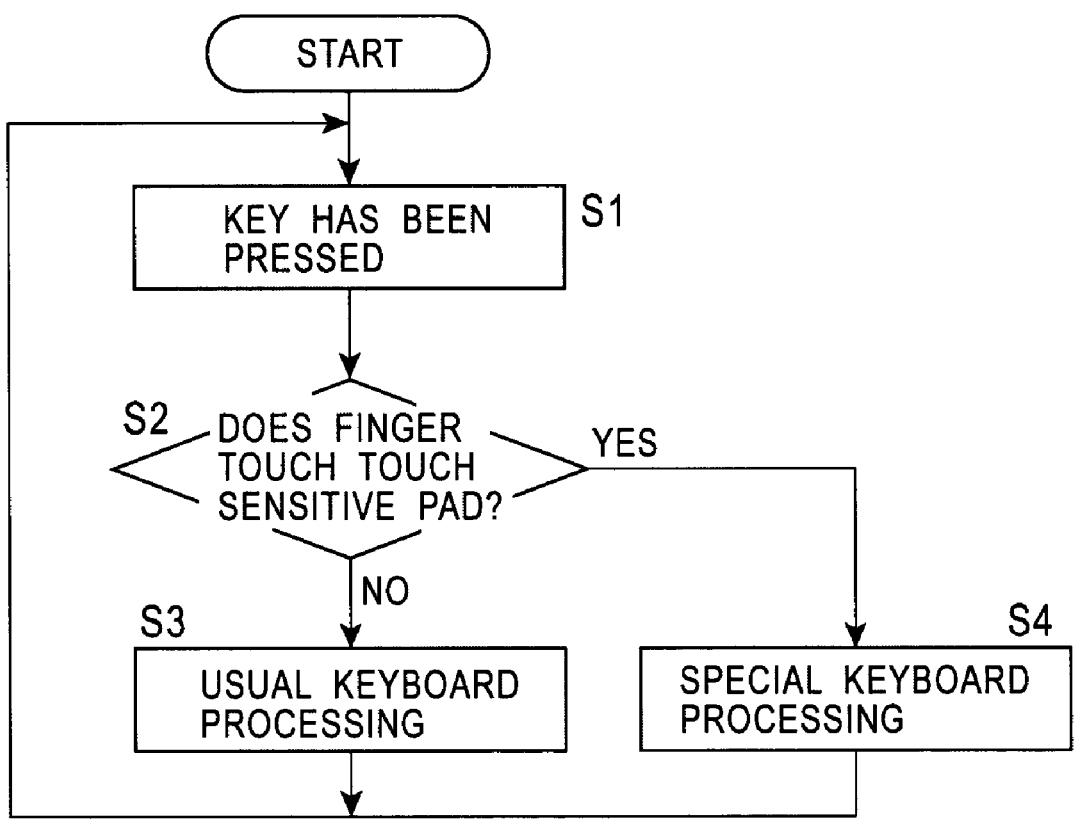
FIG. 9 is a flowchart of a processing procedure for switching key assignment in response to a finger-tip contact on the touch sensitive pad 6.

FIG. 9 is a flowchart of a processing procedure for switching key assignment in response to a finger-tip contact on the touch sensitive pad 6, such as that described above.

Such processing operations are actually implemented by the cooperation of the keyboard driver and the touch-sensitive-pad driver both being executed in the CPU 101.

When the user presses a key on the keyboard 4, the keyboard 4 generates an interrupt request at a predetermined interrupt level, and the keyboard driver performs interrupt processing in response to the request to identify the pressed key (in step S1).

At this time, it is determined whether a user's finger tip contacts the touch sensitive pad 6 (in step S2). As described above, the touch sensitive pad 6 employs the capacitance detection method to detect the contact of a finger tip of the user on the touch sensitive pad 6 by a change in capacitance obtained when the finger tip touches the surface of the touch sensitive pad 6.

To avoid erroneous detection of the contact of a finger tip, the finger-tip contact may be detected in step S2 by whether the finger tip contacted the touch sensitive pad 6 within the past predetermined period (such as 100 milliseconds).

When a finger-tip contact is not detected, since it means that the user does not perform a coordinate designation operation through the touch sensitive pad 6, the assignment of the keyboard 4 does not need to be changed. Therefore, the keyboard driver performs usual keyboard processing (in step S3).

When a finger tip contacts the touch sensitive pad 6, since it is understood that the user tries to perform a coordinate designation operation through the touch sensitive pad 6, it is necessary to change the assignment of the keyboard 4. When a finger-tip contact is detected, the touch sensitive pad 6 generates an interrupt request at a predetermined interrupt level, and the touch-sensitive-pad driver performs interrupt processing. In this interrupt processing, the touch-sensitive-pad driver reports the finger-tip contact to the keyboard driver. In response to this report, the keyboard driver changes the assignment of specific keys, such as the F and J keys, so that they serve as function keys, such as the left and right click buttons (in step S4). As a result, pressing the specific keys are reported to the upper-level software, such as the operating system and application programs, according to the interpretation thereof after the assignment has been changed.

Figure 10:
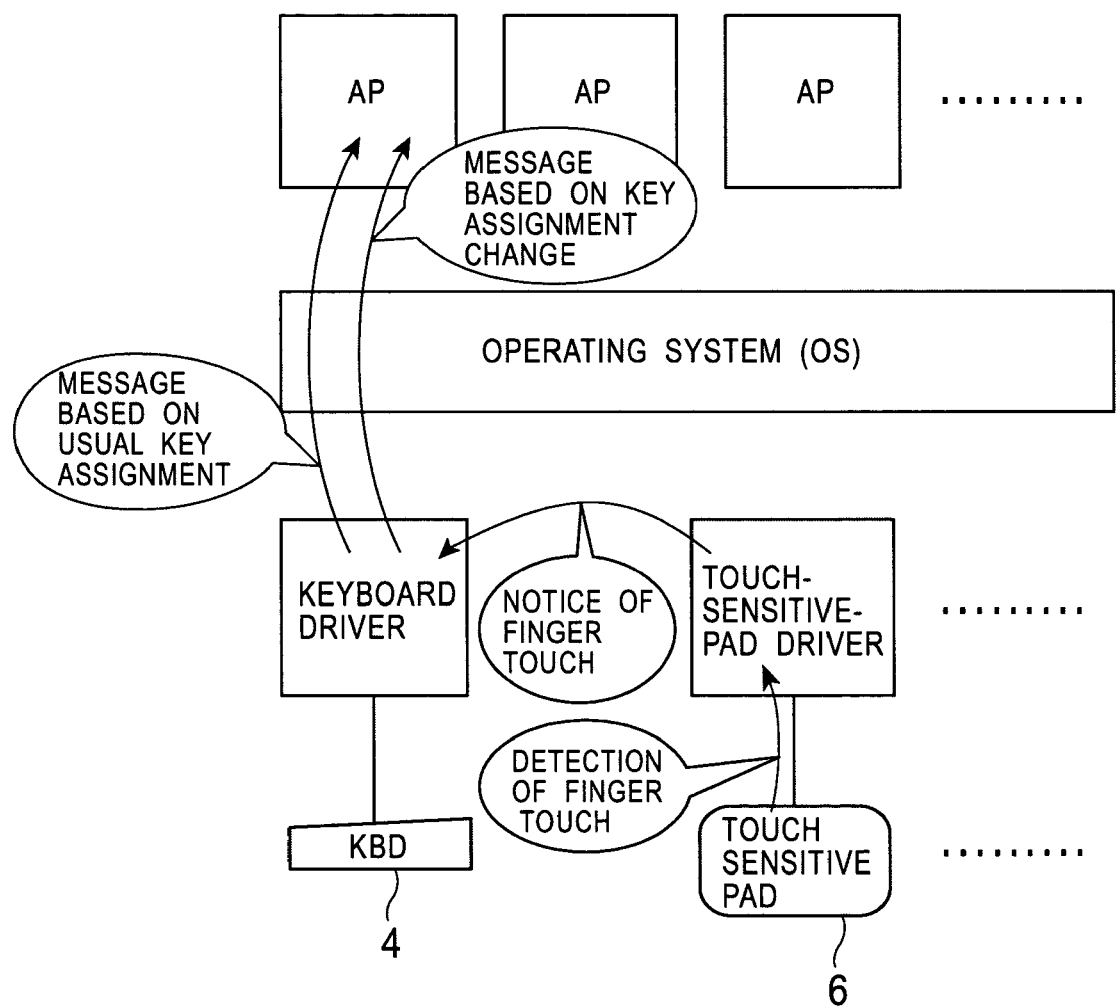
FIG. 10 is a view showing the mechanism of the cooperative operations between software modules for switching the key assignment in response to a finger-tip contact on the touch sensitive pad 6, in a sketch manner.

FIG. 10 shows the mechanism of the cooperative operations between software modules for switching the key assignment in response to a finger-tip contact on the touch sensitive pad 6, as described above, in a sketch manner.

The keyboard driver processes the interrupt request generated by the keyboard 4, identifies the pressed key, and sends a processing-result message to upper-level software, such as the application programs and operating system. In usual operation mode, the keyboard driver interprets key-pressing operations according to the original key assignment, such as the QWERTY arrangement.

The touch-sensitive-pad driver processes the interrupt request generated by the touch sensitive pad 6 when a finger tip contacts or a finger tip moves, detects the position, movement distance, movement speed, and others of the finger tip of the user, moving on the touch sensitive panel 6, and sends a processing-result message to upper-level software, such as the application programs and operating system.

In the present embodiment, when it is determined that a finger tip of the user has contacted the touch sensitive pad 6, the touch-sensitive-pad driver reports the event to the keyboard driver. In response to this report, the keyboard driver changes the assignment of specific keys, such as the F and J keys, so that they serve as function keys such as the left and right click buttons. As a result, pressing the specific keys are reported to the upper-level software, such as the operating system and application programs, according to the interpretation thereof after the assignment has been changed.

C. Application to Cut-and-Paste Function

The present invention basically controls the assignment of the functions of specific keys on a keyboard according to user's operations for a coordinate input apparatus (see FIG. 7 and FIG. 8). As a modification thereof, the present invention can be applied to a cut-and-paste operation, which is one of typical GUI operations with a mouse.

In this case, an area designation operation is performed on the touch sensitive panel 6 while a predetermined key is being pressed on the keyboard 4, and the content of the designated area is temporarily stored, for example, by a clipboard function, in response to the release of pressing the predetermined key.

Then, a position is designated on the touch sensitive panel 6 while a predetermined key is being pressed on the keyboard 4, and the content stored in the clipboard is copied (pasted) to the position designated by the touch sensitive pad 6.

While a finger contacts the touch sensitive pad 6, a predetermined key, such as the V key, functions as a paste button. A cut command copies data to a paste buffer (clipboard). It is assumed that the paste buffer holds a plurality of data items.

It is assumed that a "paste" command is assigned to the V key. When the V key is pressed and then released immediately, the last item in the paste buffer is pasted. When a finger is moved on the touch sensitive pad while the V key is being pressed, the items in the paste buffer are displayed in a menu. When an item is selected by a pointer operation and the V key is released, the desired data is pasted to the designated position.

In this way, when a key is just pressed, the corresponding "basic function" is executed, and when a finger is moved on the touch sensitive pad 6 while the key is being pressed, the corresponding "extended function" is executed.

Figure 11:
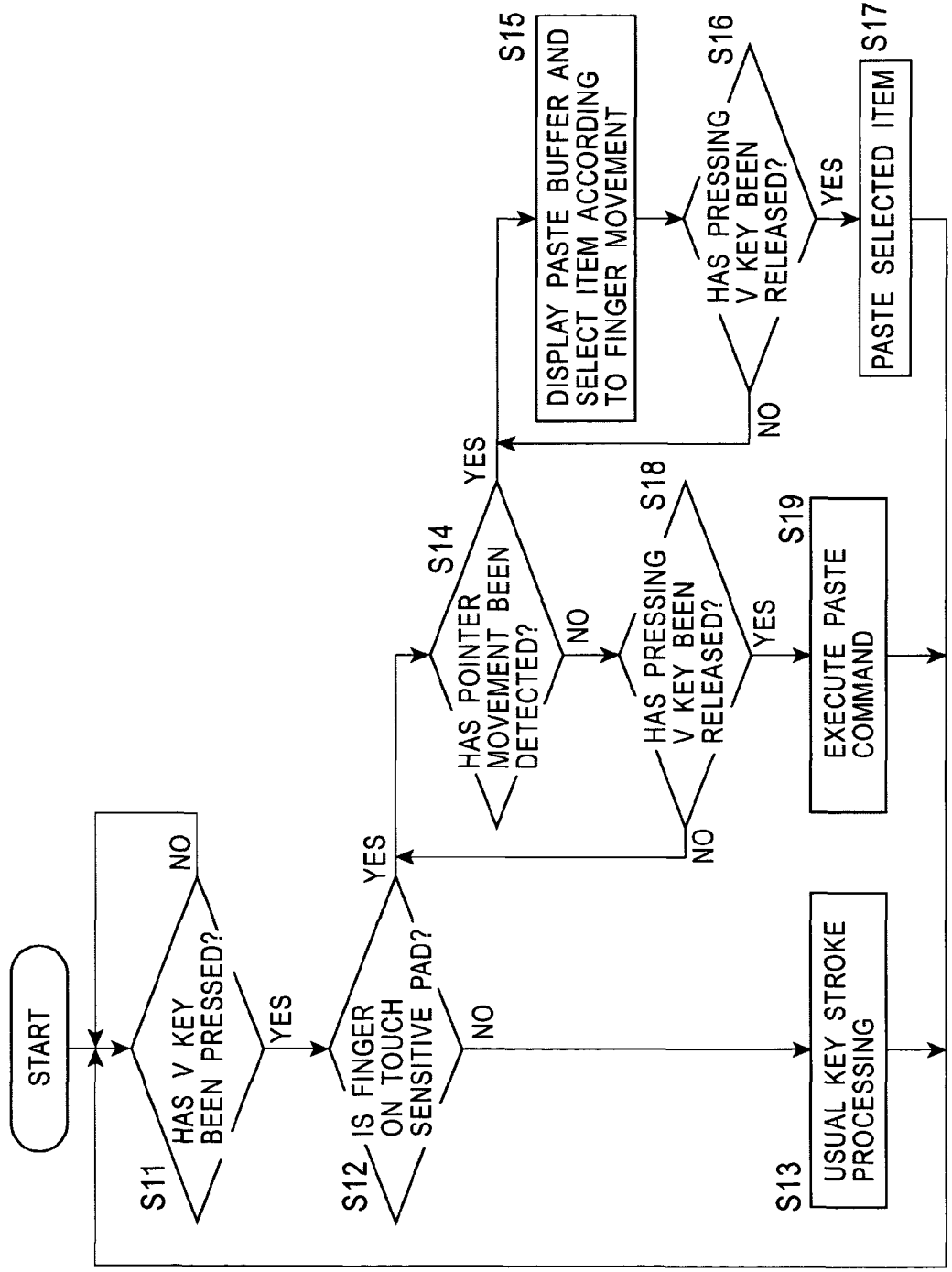
FIG. 11 is a flowchart of a processing procedure for simplifying a "cut-and-paste" operation by function-assignment control applied to a specific key on the keyboard according to a user operation for a coordinate input apparatus.

FIG. 11 is a flowchart of a processing procedure for simplifying the "cut-and-paste" operation by function-assignment control applied to a specific key on the keyboard according to a user's operation for a coordinate input apparatus.

When it is determined (in step S11) that the user has pressed the V key, it is determined (in step S12) whether a user's finger contacts the touch sensitive pad 6.

When it is determined that a user's finger does not contact the touch sensitive pad 6, pressing the V key is processed by usual key-pressing processing (in step S13).

When it is determined that a user's finger contacts the touch sensitive pad 6, a "paste button" is assigned to the V key, and it is determined whether the movement of a pointer has been detected on the touch sensitive pad 6 (in step S14).

When it is determined that the movement of the pointer has been detected on the touch sensitive pad 6, it is understood that the user is designating an area to be cut on the screen. Then, the paste buffer is displayed, and an item is selected according to the movement of a finger on the touch sensitive pad 6 (in step S15).

When pressing the V key is released (in step S16), the "cut" command is executed, and the selected item is pasted (in step S17).

When it is determined in step S14 that the movement of the pointer has not been detected, a "paste" command is executed at a position designated through the touch sensitive pad 6, namely, the content held by the paste buffer is copied to the designated position, (in step S19) in response to the detection of pressing the V key (in step SC).

D. Application to Another Coordinate Input Apparatus

An embodiment of the present invention has been described by taking a touch sensitive pad as a coordinate input apparatus for a portable computer, such as a notebook-type computer, as an example.

The present invention can be suitably applied even to in-keyboard-embedded devices other than a touch sensitive pad, serving as substitutes for a mouse.

A case will be described below in detail in which the present invention is applied to a device which is other than a touch sensitive pad, which is used as a substitute for a mouse, and which is provided at a suitable position in the key arrangement of a keyboard and designates coordinates by pressure applied in the directions left and right and back and forth, like a "track point".

Figure 12:
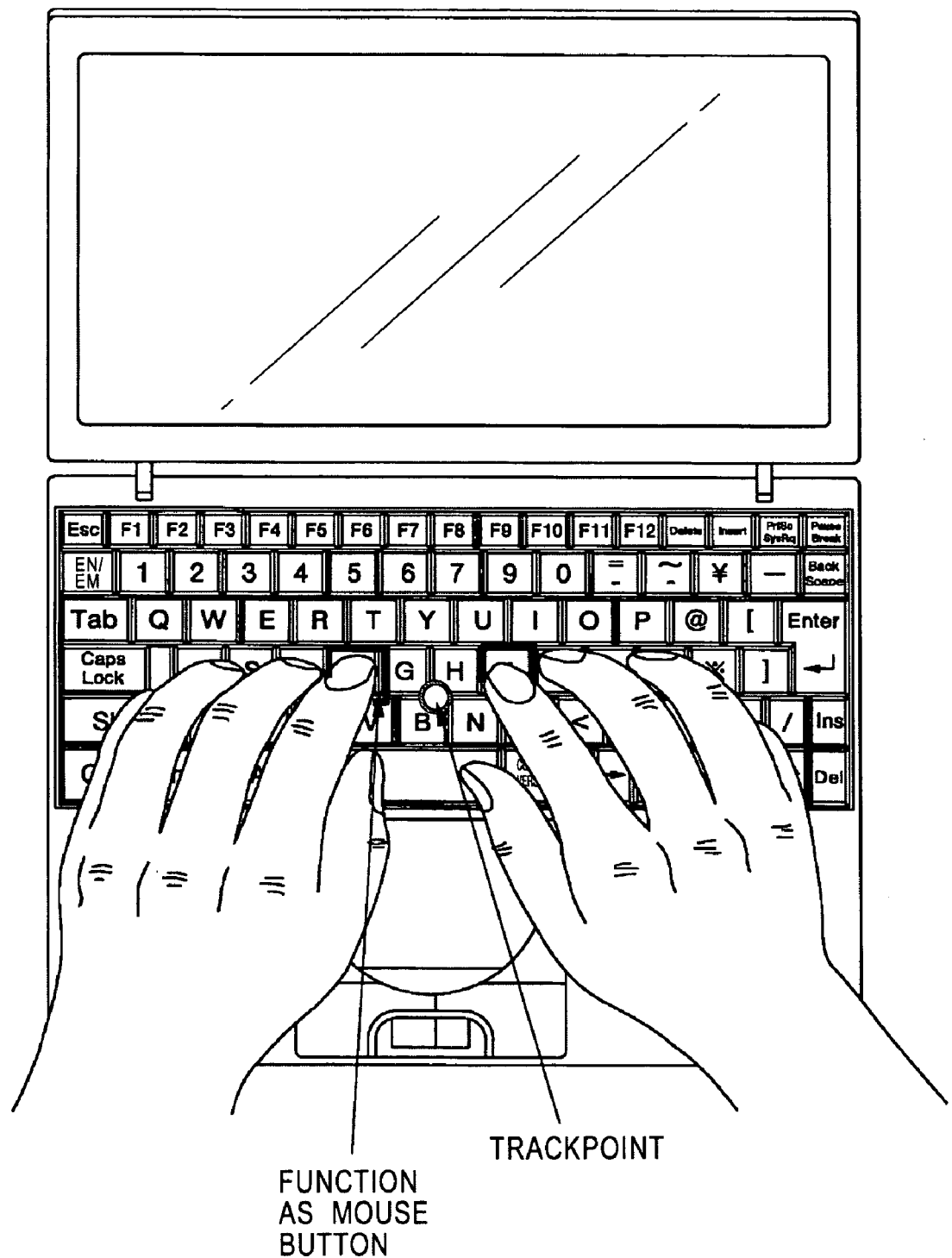
FIG. 12 is a view showing a case in which a track point is used as an in-keyboard-embedded coordinate input apparatus.

The track point is a stick-shaped input apparatus provided almost at the center (for example, a position enclosed by the G, H, and B keys) of the keyboard. The point of action of the stick is enclosed by pressure sensors in four directions, left and right and back and forth (see FIG. 12). When the user presses the tip (the point where force is applied) of the stick by a finger tip, the direction and magnitude of the pressing pressure are detected by the sensors, and a signal equivalent to the displacement of a mouse ball is generated according to the outputs of the sensors.

When a touch sensitive sensor is provided at the tip of the track point to detect a finger contact, the switching operation of key assignment in response to a finger-tip contact, as shown in FIG. 9, and the cut-and-paste operation processing, as shown in FIG. 11, can be implemented in the same way. Alternatively, even if a touch sensitive sensor is not provided, the same operations can be achieved with the use of the output signals of the four pressure sensors provided left and right and back and forth at the point of action of the stick.

While a finger is touching the track point, mouse buttons are assigned to a space key or to the F and D keys operated by the left hand. With this, the mouse buttons do not need to be provided at the front edge of the keyboard, allowing the computer to be made compact.

The present invention has been described in detail by referring to the specific embodiments. It is obvious that persons skilled in the art can generate modifications and alternatives of the embodiments within the spirit of the present invention. In other words, the present invention has been disclosed in a form of exemplification, and the content of the present specification should not be interpreted in a restrictive manner. To determine the spirit of the present invention, claims should be carefully considered.

The entire disclosure of Japanese Patent Application No. 2002-2441629 filed on Aug. 23, 2002 including specification, claims, drawings and summary is incorporated herein by reference in its entirety.

What is claimed is:

1. An information processing unit for executing predetermined processing in response to a user input, comprising:
    a key input section provided with a plurality of keys for inputting data assigned to a pressed key;
    a coordinate input section for performing a coordinate input according to a user's finger contact operation;
    a key-assignment control means for changing a key assignment in the key input section in response to the user's finger contact, operation detected by the coordinate input section; and
    a designated-area storage means for storing content of a designated area,
    wherein the coordinate input section designates the area when a predetermined key is pressed and then released in the key input section.

2. The information processing unit according to claim 1, wherein the key-assignment control means applies the key assignment for usual key input operations to each key of the key input section when the coordinate input section does not detect the contact of the user's finger, and changes the key assignment to a specific key of the key input section when the coordinate input section detects the contact of the user's finger.

3. The information processing unit according to claim 1, wherein the key-assignment control means assigns a function for designating an input-coordinate selection operation to a home-position key in the key input section in response to the user's finger contact operation detected by the coordinate input section.

4. The information processing unit according to claim 1, wherein the key-assignment control means assigns a menu selection function or another function to a key in the key input section in response to the user's finger contact operation detected by the coordinate input section.

5. The information processing unit according to claim 1, wherein the coordinate input section determines that the user's finger has contacted, the coordinate input section based on detection of the user's finger within a past predetermined period.

6. The information processing unit according to claim 1, further comprising:
a designated-area duplication means for duplicating the content stored by the designated-area storage means at a designated position,
wherein the coordinate input section designates the position when a predetermined key is pressed and then released in the key input section.

7. A control method for an information processing unit including a key input section and a coordinate input section for performing an operation according to a user input operation, the control method comprising:
determining whether the user input operation has been performed for the key input section;
detecting contact of a user's finger on the coordinate input section;
performing a process according to a position of the contact of the user's finger on the coordinate input section;
interpreting the user input operation performed for the key input section according to whether or not the contact of the user's finger on the coordinate input section has occurred; and
storing content of a designated area,
wherein the coordinate input section designates the area when a predetermined key is pressed and then released in the key input section.

8. The control method for the information processing unit according to claim 7,
wherein in the step of interpreting the user input operation performed for the key input section, a key assignment for usual key input operations is applied to each key of the key input section when the coordinate input section does not detect the contact of the user's finger, and the key assignment is changed to a specific key of the key input section in response to the contact of the user's finger detected by the coordinate input section.

9. The control method for the information processing unit according to claim 7,
wherein in the step of interpreting the user input operation performed for the key input section, a function for designating an input-coordinate selection operation is assigned to a home-position key in the key input section in response to the contact of the user's finger detected by the coordinate input section.

10. The control method for the information processing unit according to claim 7,
wherein in the step of interpreting the user input operation performed for the key input section, a menu selection function or another function is assigned to a key in the key input section in response to the contact of the user's finger detected by the coordinate input section.

11. The control method according to claim 7,
wherein in the step of detecting the contact of the user's finger on the coordinate input section, the contact of the user's finger is determined based on detection of the user's finger within a past predetermined period.

12. The control method for the information processing unit according to claim 7, the control method further comprising:
duplicating the content stored in the step of storing content of the designated-area at a designated position,
wherein the coordinate input section designates the position when a predetermined key is pressed and then released in the key input section.

13. A computer readable medium having a program for causing a computer to perform a control method in response to a user input operation on a key input section and a coordinate input section, the method comprising:
determining whether the user input operation has been performed for the key input section;
detecting contact of a user's finger on the coordinate input section;
performing a process according to a position of the contact of the user's finger on the coordinate input section;
interpreting the user input operation performed for the key input section according to whether or not the contact of the user's finger on the coordinate input section has occurred; and
storing content of a designated area;
wherein the coordinate input section designates the area when a predetermined key is pressed and then released in the key input section.

14. An information processing method for executing predetermined processing in response to a user input, comprising the steps of:
receiving key input information according to a user's key input operation on a key input means;
receiving coordinate input information according to a user's finger contact operation on a coordinate input means;
recognizing the user input based on the received key input and the coordinate input information, wherein key assignment of the key input information is changed when the received coordinate input information is in a predefined state;
executing the processing in response to the recognized user input; and
storing content of a designated area,
wherein a coordinate input section designates the area when a predetermined key is pressed and then released in the key input section.

* * * * *

UNITED STATES PATENT AND TRADEMARK OFFICE
CERTIFICATE OF CORRECTION

PATENT NO. : 7,119,795 B2 Page 1 of 1
APPLICATION NO. : 10/645100
DATED : October 10, 2006
INVENTOR(S) : Junichi Rekimoto It is certified that error appears in the above-identified patent and that said Letters Patent is hereby corrected as shown below:

Column 12, line 61, "contact, operation" should read --contact operation--.

Column 13, line 23, "contacted, the" should read --contacted the--.

Signed and Sealed this

Ninth Day of January, 2007

JON W. DUDAS
*Director of the United States Patent and Trademark Office*